(No Model.)

P. E. MERRIHEW.
CAR WHEEL.

No. 307,565. Patented Nov. 4, 1884.

Witnesses.
H. Brown.
A. L. White.

Inventor
P. E. Merrihew
by Knight & Brown
Attys.

UNITED STATES PATENT OFFICE.

PHINEAS E. MERRIHEW, OF FAIRHAVEN, MASSACHUSETTS.

CAR-WHEEL.

SPECIFICATION forming part of Letters Patent No. 307,565, dated November 4, 1884.

Application filed March 17, 1884. (No model.)

*To all whom it may concern:*

Be it known that I, PHINEAS E. MERRIHEW, of Fairhaven, State of Massachusetts, have invented certain Improvements in Car-Wheels, of which the following is a specification.

This invention relates to that class of car-wheels in which a body of paper or other like material is interposed between the tire or tread and the axle.

The invention has for its object to provide improved means for firmly securing the metal rim or tread and the non-metallic body to the hub or metallic central portion of the wheel in such manner that the rim will be supported only by the non-metallic body, and will have no metallic support against pressure exerted radially inward, as I will now proceed to describe.

Figure 1:
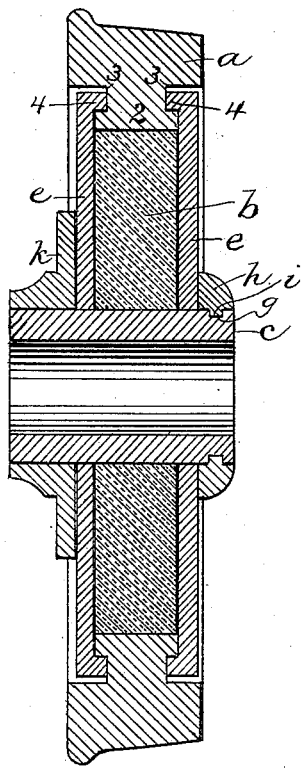
Figure 2:
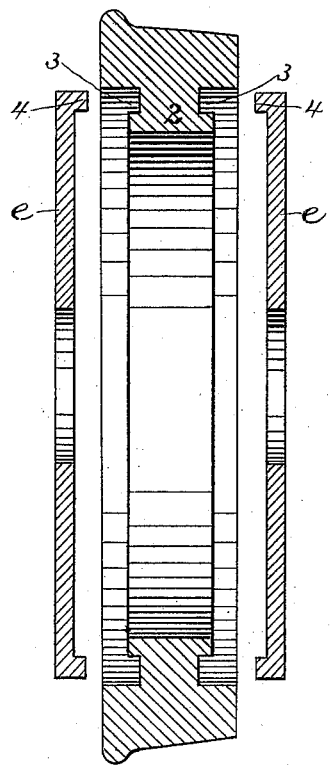

Of the accompanying drawings, forming a part of this specification, Figure 1 represents a transverse central section for wheel embodying my invention. Fig. 2 represents a sectional view showing the hub and non-metallic filling removed.

The same letters of reference indicate the same parts in all the figures.

In the drawings, *a* represents the metal rim; *b*, the non-metallic body, of paper or other suitable material; and *c*, the metallic hub. The non-metallic body is interposed between the rim and hub, and serves, as in other wheels of this class, to absorb the vibrations incident to the movement of the wheel upon the track.

In carrying out my invention I form on the inner surface of the rim an inwardly-projecting annular shoulder, 2, having annular grooves 3 3 in its opposite sides. I also provide two plates or webs, *e e*, having laterally-projecting annular flanges 4 4 at their margins, and rigidly secured at their centers to the hub by means hereinafter described. The plates or webs *e* are of such diameter that when they are expanded by a given degree of heat the flanges 4 4 will exactly fit in the grooves 3 3 in the rim. When the plates are thus heated and their flanges inserted in the grooves 3, the contraction of the plates caused by cooling will cause the flanges 4 to exert a powerful inward pressure on the rims, thereby causing it to bear firmly against the non-metallic body. The inner surfaces of the flanges 4 press inwardly against the opposing shoulders of the grooves 3, while the margins of the plates *e* are separated from the inner surface of the rim or tire by the contraction of the plates, as shown in Fig. 1, so that there is no outward pressure of the plates against the rim. Thus the rim is held in firm and lasting union with the hub and with the non-metallic body without having any inside metal bearing. The vibrations are, therefore, fully absorbed by the non-metallic body, and crystallization of the metal, such as would be caused by a metallic supporting-connection between the hub and rim, is prevented. The hub is a tube passed through central orifices in the plates *e e*, and projecting at both ends beyond the outer sides of said plates, and having a flange or head, *k*, formed at one end. In the opposite ends of the hub is formed a groove, *g*.

*h* represents a collar, which is formed so that when heated it may be placed upon the projecting end of the hub, and when cooled will shrink into the groove *g*, an annular rib, *i*, being provided on said collar, which fits into the said grooves. This construction is substantially the same as that shown in my patent dated November 13, 1883, excepting the solid head *k*. It is obvious, however, that the plates *e e* may be secured by bolts passed through the plates and through the non-metallic filling or body, instead of being secured by the hub and its collars. The non-metallic body or filling may be of paper, wood, or any other suitable material.

By the described connection of the rim to the hub I am enabled to secure a close bearing of the rim upon the body or filling without pressing the body or filling outwardly against the rim at a great pressure, as has been considered necessary heretofore in the manufacture of wheels of this class, the pressure employed having been in many cases so extreme as to cause the rim to burst or fracture. This danger I entirely obviate.

The flanges 4 and the sides of the grooves 3, against which they bear, may be slightly beveled, so that when the plates *e* are shrunken the flanges will be locked in the grooves, so that they cannot be removed laterally without breakage.

I claim—

The improved car-wheel composed of the metallic hub, the metallic rim or tire, the non-metallic body or filling, and the flanged metallic webs or plates secured to the hub, and having flanges shrunk into grooves formed in the rim, as set forth.

In testimony whereof I have signed my name to this specification, in the presence of two subscribing witnesses, this 12th day of March, 1884.

PHINEAS E. MERRIHEW.

Witnesses:
C. F. BROWN,
A. L. WHITE.